(12) United States Patent
Jones et al.

(10) Patent No.: US 7,039,918 B2
(45) Date of Patent: May 2, 2006

(54) SERVICE PROCESSOR AND SYSTEM AND METHOD USING A SERVICE PROCESSOR

(75) Inventors: Rhod J Jones, Crowthorne (GB); James E King, Wokingham (GB)

(73) Assignee: Sun Microsystems, Inc., Santa Clara, CA (US)

( * ) Notice: Subject to any disclaimer, the term of this patent is extended or adjusted under 35 U.S.C. 154(b) by 764 days.

(21) Appl. No.: 09/939,117

(22) Filed: Aug. 24, 2001

(65) Prior Publication Data

US 2002/0091869 A1 Jul. 11, 2002

(30) Foreign Application Priority Data

Jan. 8, 2001 (GB) .................................. 0100439

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................... 719/310; 710/31; 712/225; 712/229

(58) Field of Classification Search ................ 719/310, 719/328; 709/223, 250; 710/20, 52, 104; 713/201, 1, 2, 100; 712/28–37, 225, 229
See application file for complete search history.

(56) References Cited

U.S. PATENT DOCUMENTS

| | | | |
|---|---|---|---|
| 4,685,124 A | | 8/1987 | Smitt et al. |
| 4,894,828 A | * | 1/1990 | Novy et al. ................. 714/11 |
| 5,283,871 A | * | 2/1994 | Kobayashi .................. 709/227 |
| 5,329,625 A | * | 7/1994 | Kannan et al. .............. 345/173 |
| 5,606,674 A | * | 2/1997 | Root .......................... 345/769 |
| 5,758,157 A | | 5/1998 | Greenstein et al. |
| 5,781,434 A | | 7/1998 | Tobita et al. |

(Continued)

FOREIGN PATENT DOCUMENTS

EP 0247605 5/1987

OTHER PUBLICATIONS

Netra T1 AC200/DC200 Server, White paper, Sun Microsystems, Inc., Version 1.0, Febrary 2001.*

*Primary Examiner*—William Thomson
*Assistant Examiner*—Diem Cao
(74) *Attorney, Agent, or Firm*—Meyertons Hood Kivlin Kowert & Goetzel, P.C.; B. Noël Kivlin

(57) ABSTRACT

A service processor is provided for a computer system that includes a host processor and the service processor. The service processor includes a management interface including a first port forming an external user interface and a second port forming an internal console interface. The service processor is operable to provide system management functions within the computer system. It is also operable to respond to external mode switching commands received via the user interface to operate one of two modes. The first mode is a management mode in which commands received via the user interface are processed by the service processor. The second mode is a console mode in which commands received via the user interface are passed by the service processor to the console interface for processing by the host processor. The service processor can be implemented by a dual-ported microcontroller. Remotely controlled management functions and console functions can thus be supported via a single external interface port by effecting mode switching internal to the service processor.

21 Claims, 4 Drawing Sheets

U.S. PATENT DOCUMENTS

| | | |
|---|---|---|
| 5,784,617 A | 7/1998 | Greenstein et al. |
| 5,974,364 A | 10/1999 | Kim |
| 6,044,476 A | 3/2000 | Ote et al. |
| 6,088,816 A * | 7/2000 | Nouri et al. ............ 714/31 |
| 6,122,732 A * | 9/2000 | Ahuja ............ 713/1 |
| 6,128,007 A * | 10/2000 | Seybold ............ 345/179 |
| 6,192,423 B1 * | 2/2001 | Graf ............ 710/31 |
| 6,266,721 B1 * | 7/2001 | Sheikh et al. ............ 710/100 |
| 6,658,594 B1 * | 12/2003 | Bui et al. ............ 714/10 |
| 6,742,139 B1 * | 5/2004 | Forsman et al. ............ 714/23 |
| 2004/0010650 A1 * | 1/2004 | Vinnakota et al. ............ 710/305 |
| 2004/0028073 A1 * | 2/2004 | King et al. ............ 370/461 |

* cited by examiner

SERVICE PROCESSOR AND SYSTEM AND METHOD USING A SERVICE PROCESSOR

BACKGROUND OF THE INVENTION

This invention relates to a service processor for providing system management functions, including environmental monitoring functions, in a computer system. The provision of a service processor for providing the management functions relieves the host processor(s) of these tasks.

A service processor is provided in, for example, a Netra-t1 100 server manufactured by Sun Microsystems, Inc. This known service processor provides Lights Out Management service processor functions. This service processor, that is implemented using a microcontroller, provides basic independent monitoring and control functions within the server. The service processor in this prior product is connected to a serial network port via a multiplexer. The multiplexer enables a remote management station to interface either with the service processor for providing management functions or with the host processor for providing console functions. However the provision of a multiplexer and the associated control circuitry adds cost and complexity.

An aim of the present invention is to provide a low cost and flexibly implemented service processor.

SUMMARY OF THE INVENTION

A first aspect of the invention provides a service processor for a computer system that includes a host processor and the service processor. The service processor includes a management interface including a first port forming an external user interface and a second port forming an internal console interface. The service processor is operable to provide system management functions within the computer system. It is also operable to respond to external mode switching commands received via the user interface to operate one of a management mode in which commands received via the user interface are processed by the service processor and a console mode in which commands received via the user interface are passed by the service processor to the console interface for processing by the host processor.

An embodiment of the invention thus employs a dual-ported service processor. By configuring the dual-ported service processor selectively to either process commands received from an external source or to pass those commands for processing by the host processor, remotely controlled management functions and console functions can be supported via a single external interface port. Moreover, this can be achieved without the additional requirement for a multiplexer, with the consequent reduction in size, cost and complexity of the overall system.

In a particular example of the invention the service processor is implemented by a microcontroller that includes the first and second ports, as well as control logic for implementing internal switching between the management and console modes. Dual-ported microcontrollers are available on the market at low cost.

The control logic can be implemented using microcode operable to provide the internal switching between the management and console modes.

The microcontroller typically includes internal memory. In a particular embodiment of the invention, generic microcode is held in the microcontroller for controlling its operation irrespective of a particular implementation. The internal memory can be implemented using flash memory to facilitate programming and updating of the content thereof.

Advantageously, application specific information for supplementing the generic microcode is held in an external memory. This facilitates the adaptation of the generically programmed module to a specific application (i.e. for use in a particular system). The external memory can be implemented, for example, using an electrically erasable programmable read only memory.

In operation, the control logic can be operable to monitor signals received it the first port and to respond to a console mode switching command by operating in the console mode and to respond to a management mode switching command by operating in the management mode.

In a particular embodiment the first port provides a first serial interface and the second port provides a second serial interface. The first port can include a first UART and the second port can include a second UART for implementing a serial interface.

In another aspect the invention provides a computer system that includes a host processor and a service processor as defined above.

In an exemplary implementation, the first port can be connected directly via a port transceiver to an external serial interface connector of the computer system, with the second port being connected via a bus bridge to the host processor.

The computer system could be a computer server. The service processor can be arranged to provide at least one of the following internal computer system functions: power management control: environmental monitoring; fan control; voltage rail monitoring; and system status monitoring.

A further aspect of the invention relates to a method of providing external system management and console monitoring services in a computer system that includes a host processor. The method includes receiving external commands at a first port of a service processor in the computer system. The service processor provides management functions within the computer system and further includes a second port. The first port forms an external user interface for the computer system and the second port forms an internal console interface. The method further includes responding to a management mode switching command received via the user interface by operating in a management mode in which commands received via the user interface are processed by the service processor. The method also includes responding to a console mode switching command received via the user interface by operating in a console mode in which commands received the user interface are passed by the service processor to the console interface for processing by the host processor.

Yet a further aspect of the invention relates to a method of switching between operating modes for providing external system management and console monitoring services in such a computer system. The method comprises: operating in a console mode in which commands received via the user interface are passed by the service processor to the console interface for processing by the host processor; receiving signals from the user interface; determining from the received signals if an access sequence has been received; on receipt of an access signal, switching from the console mode to a management mode in which commands received via the user interface are processed by the service processor; operating in the management mode; and switching back to the console mode in response to a predetermined event.

A method according to the invention thus provides a method of efficiently enabling operation in either a remote console mode or a remote management mode using a single external port without the overhead of providing a hardware multiplexer for switching between functions.

Further aspects and advantages of the invention will become apparent from the following description of a preferred embodiment.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described in the following with reference to the accompanying drawings.

An exemplary embodiment of the present invention will now be described, by way of example only.

Figure 1:
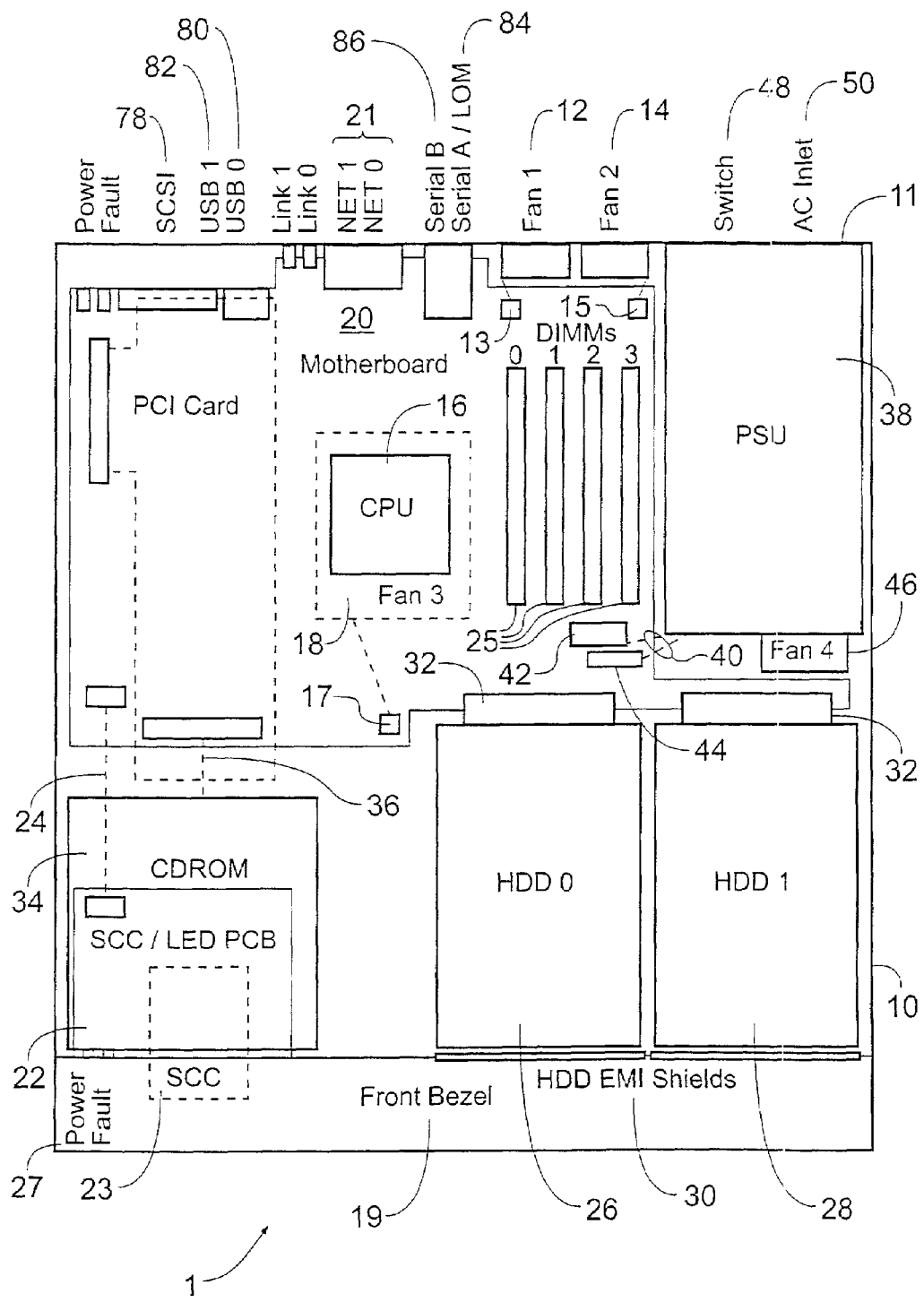
FIG. 1 is a physical plan view of a computer system that implements an embodiment of the invention.

FIG. 1 is a physical plan view of narrow form factor computer system 1 designed for rack mounting that implements an embodiment of the invention. This embodiment of the invention seeks to provide a compactly configured computer server offering high performance at reasonable cost.

The computer system 1 comprises an enclosure 10 with a front bezel 19 that is removable for front access to the disk drives and a System Configuration Card (SCC) 23 and reader 22. Rack mounting is supported for standard 19" racks via right-angled flanges (not shown). Slide-rail support is also provided.

The enclosure 10 is cooled, from front to rear, by two system fans 12, 14 mounted on a rear panel of the enclosure, with venting in the front and rear panels as required. The host processor (CPU) 16 also has its own dedicated local cooling comprising an impingement fan 18 that clips onto the CPU socket. These three fans plug directly into the motherboard 20 at 13, 15 and 17, respectively. The motherboard 20 is a PCB assembly, designed in a custom form-factor to fit the enclosure 10. The shape of the motherboard is chosen so as to minimise cabling within the enclosure. The motherboard 20 carries the majority of circuitry within the computer system 1.

All external interfaces are included directly on the rear edge of the motherboard, for access through the rear-panel 11 of the enclosure 10. The external interfaces comprise two network interfaces 21, two serial interfaces 84, 86 and a Small Computer System Interface (SCSI) interface 78. Indicators for Power, Fault and Network Link status are also positioned at the rear of the enclosure.

A system, or host, processor (CPU) 16 for the computer system 1 is mounted in a standard 370 pin zero insertion force (ZIF) socket on the motherboard 20. It has a passive heat sink. Dual in-line memory modules (DIMMs) are mounted in sockets 25 on the motherboard 20. A small printed circuit board (PCB) 22 is included at the front of the enclosure 10 to carry a System Configuration Card (SCC) 23 and LEDs 27 for Power and Fault status indication. A 10-way ribbon cable 24 connects this PCB to the motherboard 20. Two SCSI hard disk drives 26 and 28 are mountable in respective bays to the front of the motherboard 20. The drives are hot-pluggable and are accessible by removal of the front bezel 19 and EMI shields 30. The two internal SCSI hard disk drives 26 and 28 plug directly into the motherboard via right-angled connectors 32 located on the front edge of the motherboard 20.

A slim (notebook-style) CDROM drive bay is provided, mounted laterally in front of the motherboard for a CDROM drive 34. Compact disks may be inserted End removed via an access slot (not shown) located on the lower left side of the front bezel 19. A connector at the rear of the CDROM bay connects the CDROM drive 34 via a ribbon cable 36 to the motherboard 20.

A Power Supply Unit (PSU) 38 is connected to the motherboard via a short harness 40 with two mating connectors 42 and 44 for power and services. The PSU 38 has its own cooling fan 46 and additionally houses the system power switch (48) and power input connector(s) 50.

Figure 2:
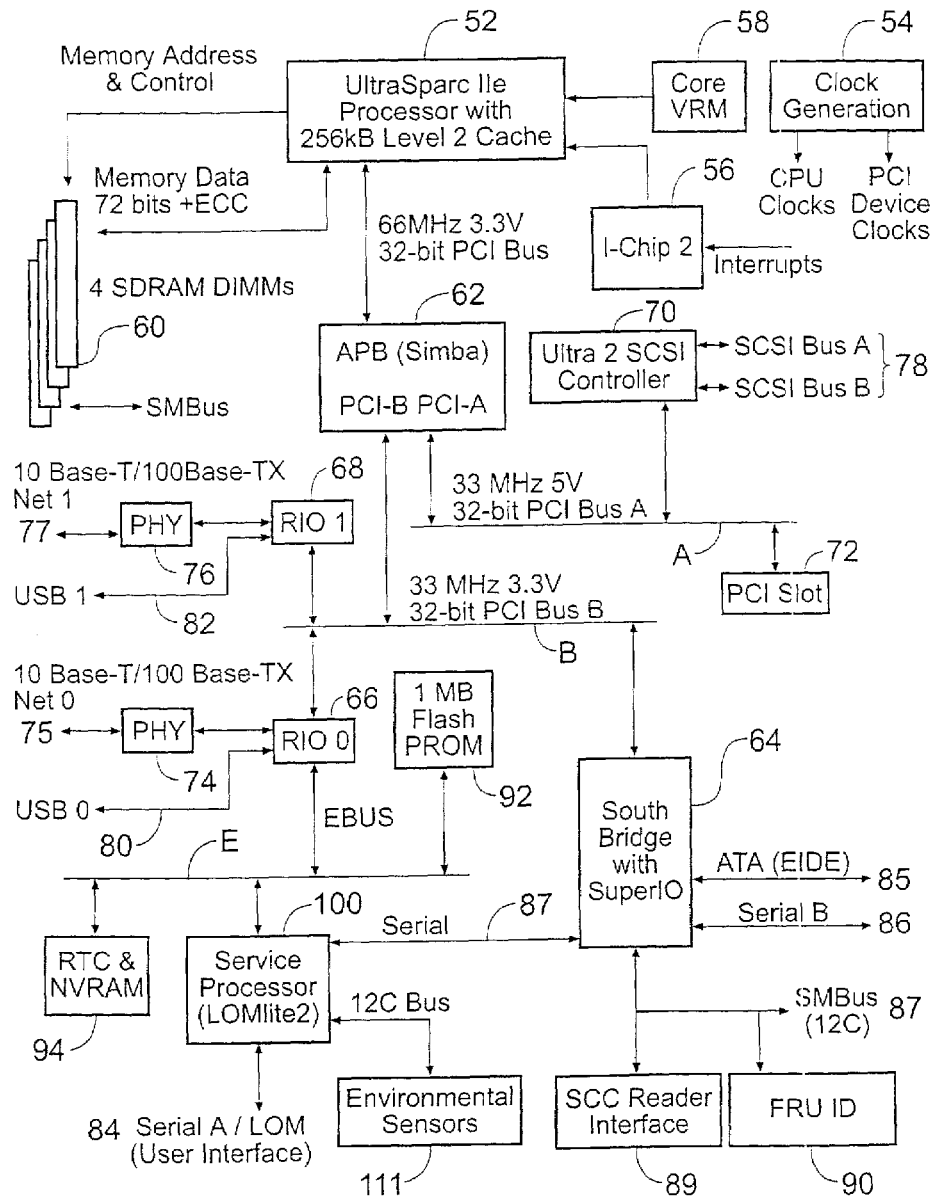
FIG. 2 is a schematic block diagrammatic representation of a system architecture of a computer system incorporating a service processor according to an embodiment of the invention.

Further aspects of an exemplary embodiment of the invention are represented in FIG. 2, which is a schematic block diagrammatic representation of the system architecture.

In this particular example of the invention, the CPU 16 of FIG. 1 is an UltraSparc IIe processor 52 available from Sun Microsystems, Inc. In other embodiments other processors could, of course, be used. A configurable clock generator 54 is provided to supply various system clocks. A vectored interrupt Controller (I-Chip2) 56 is provided for handling interrupts. Also provided is a configurable core Voltage Regulator Module (VRM) 58.

Four sockets 25 are provided for commodity DIMMs 60. Connections are provided for a 72bit data path with Error Correction Codes (ECC). A Personal Computer Interconnect (PCI) bus architecture is provided that includes an Advance PCI Bridge (APB) 62. This PCI Bridge 62 concentrates two secondary 33 MHz PCI busses (PCI Bus A and PCI Bus B) onto a primary 66 MHz PCI bus (PCI Bus) as represented in FIG. 2.

A so-called South Bridge 64 is a commodity PCI IO device used extensively in the PC industry. Among other functions, it implements a dual IDE controller, a System Management Bus (SMBus) controller, two Asynchronous Serial Interfaces and a power management controller. The IDE controller component of the South Bridge 64 supports a maximum of four IDE devices via Primary and Secondary ATA busses 85. The (SMBus) host controller provides an I2C compatible, synchronous serial channel 87 for communication with devices sharing the SMBus protocol. The SMBus is used to communicate with the DIMMs. It is also used to communicate with a System Configuration Card (SCC) reader interface 89, with a chip 90 holding information for identifying a field replaceable unit (FRU ID) to obtain configuration information and with the DIMMs 60.

The two Asynchronous Serial Interfaces provide two serial channels (Serial B and Serial) 86 and 87. The Serial B channel 86 connects directly to provide an (external port via an RJ45 connector.

The Serial channel 87 is selectively connectable to an external user interface port (Serial A/LOM) 84 having an RJ45 connector via the service processor 100. The service processor 100 selectively connects the external port 84 to, and disconnects the external port 84 from the Serial channel 87 to enable the external port 84 to be used as a combined Console/LOM port. Serial Universal Asynchronous Receiver/Transmitters (UARTs) are located within the South Bridge 64 for controlling the serial communication.

Two Personal Computer 10 (PCIO) devices (RIO 0 and RIO 1) 66 and 68 zxe also provided. These PCIO devices 66 and 68 are positioned on PCI Bus B. The first PCIO device 66 provides EBUS, Ethernet and Universal Serial Bus (USB) interfaces. EBUS is a Sun Microsystems parallel bus compatible with the so-called Industry Standard Architecture (ISA) bus protocol. The second PCIO device 68 implements Ethernet and USB interfaces.

A dual wide (16 bit) Fast-40 (Ultra2SCSI) controller 70 connects two independent SCSI busses (SCSI Bus A and SCSI Bus B) 78 to the PCI Bus A.

FIG. 2 also illustrates a 1 MB Flash PROM 92 for configuration and boot information, and a Real-time Clock with 8 kB Non-Volatile Random Access Memory (NVRAM) 94.

As shown in FIG. 2, a service processor 100 is also provided. In the present embodiment, the service processor 100 is implemented as an embedded microcontroller module based on the Hitachi H8 series of Flash microcontrollers. The module can be directly incorporated onto a motherboard at very low cost.

Figure 3:
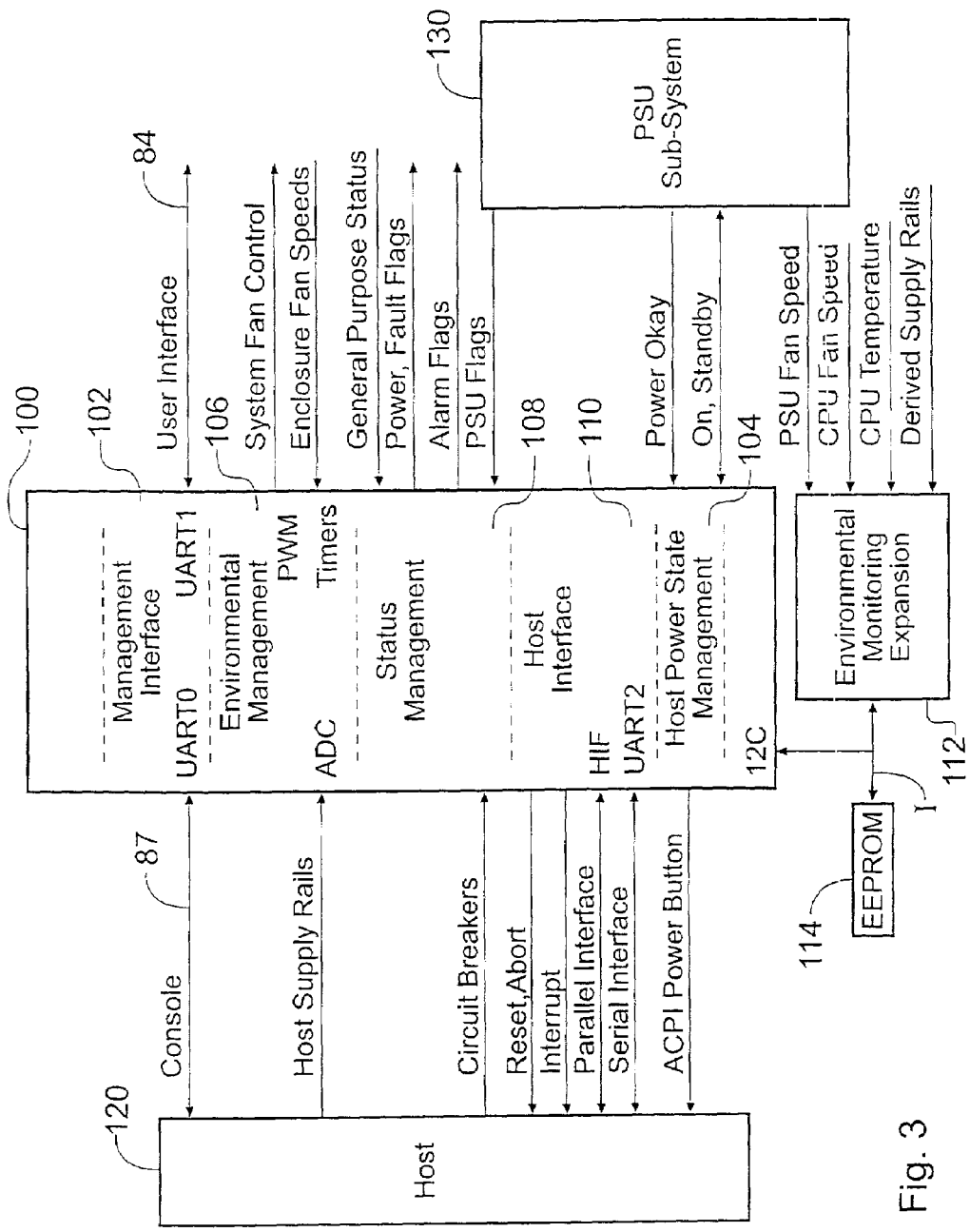
FIG. 3 is a schematic block diagram representing aspects of a service processor according to an embodiment of the invention.

FIG. 3 illustrates functional elements of the service processor 100 for providing a number of different functions, including management functions 102, 104, 106, 108 and host interface functions 110.

In accordance with an embodiment of the invention, the management functions provided by the service processor include a combined serial interface/console console management interface function 102. Other management functions include power management functions 104, enclosure environment management functions 106 and status management functions 108. Power management functions 104 include host power control, host shutdown, power-button emulation from separate ON and STANDBY switches, and power options including a programmable delayed host power-up option, a host power-up decline option as well as a power state memory (resume) function. Environmental management functions 106 include fan speed monitoring with under-speed detection, speed control of the system enclosure fans 12 and 14, enclosure temperature monitoring, CPU over-temperature alert and host supply rail voltage monitoring. Status management functions 108 include PSU status monitoring, external supply circuit breaker monitoring, host power LED control, fault LED control, soft alarms control and event log control.

The host functions provided by the service processor 100 include support for a host parallel interface 110 via the Ebus E in FIG. 2. The host functions also include a host watchdog function with optional automatic server restart, and host interrupt, host Power-On Reset (POR) and host abort (XIR) functions.

The host interface 110 of the service processor 100 connects to the parallel databus (EBus) E that connects into the first PCIO device 66. The service processor 100 is operable with respect to the EBus as an EBus peripheral device. The host interface 110 of the service processor 100 uses the least-significant bit of the EBus address bus, along with Read and Write strobes, to implement a Command/Status/Data protocol. The host interface 1 10 also includes a dedicated interrupt signal connected to the I-Chip 2 56 (see FIG. 2).

Communication between the host and service processors occurs via a dedicated software driver under the control of the operating system for the host processor 52. Specifically, the communication between the host and the service processor occurs via a service processor software driver integrated into the host operating system. This communication between the service processor and the host could be by way of a parallel bus or a serial bus, as desired, although in the preferred embodiment a parallel interface is used.

The service processor 100 communicates with the host operating system via the host interface 110 to receive commands and respond with status information. Configuration data and firmware updates are also transferred via this host interface 110. The service processor can re-initialise the host at two levels, RESET and ABORT, via management interface commands. The service processor can also implement a watchdog facility to monitor the host operating system. The host operating system pats the watchdog at regular intervals. The watchdog can be configured to perform an Automatic Server Restart (ASR) function by generating a reset signal if the timeout expires.

Communication with the host is via interrupt driven 'mailbox' registers. If the service processor has any state change to report, it posts the information to the 'mailbox' registers and interrupts the host and similarly if the host wishes to communicate with the service processor it posts the information to the 'mailbox' registers and interrupts the microcontroller 100.

Figure 4:
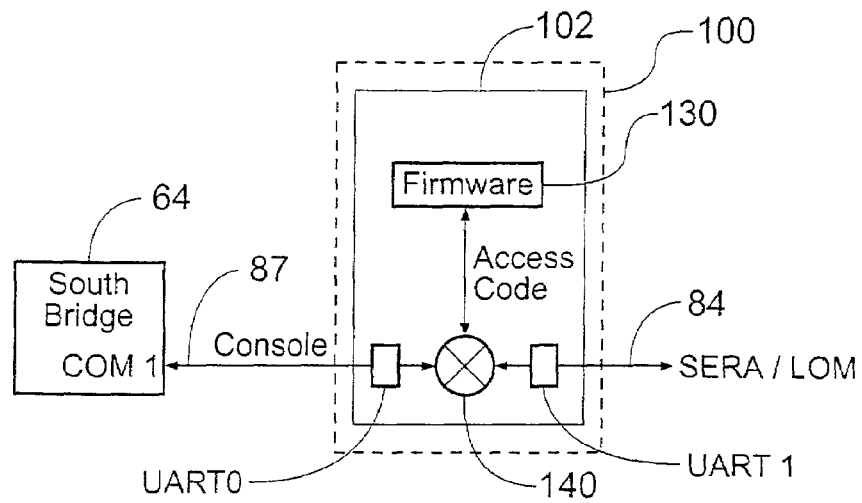
FIG. 4 is a schematic block diagram representing one aspects of the service processor of FIG. 3 in more detail.

The operation of the management interface 102 will now be described with reference to FIG. 4. As represented in FIG. 4, the microcontroller 100 of a preferred embodiment of the invention has two serial UART interfaces UART0 and UART1 that provide a console interface 87 and an external user interface 84.

The management interface 102 of the service processor 100 provides an automatic switching function 140 that enables remote user access via the external user interface 84 in two different modes. A first mode provides a management mode (e.g. a LOM mode) in which the user has access to service processor management functions. The second mode is a console mode in which the use has access to the host processor functions. The management interface allows both of these modes to be achieved, and thus enables a LOM serial interface and a host console interface via a single physical external interface.

The LOM serial interface is functionally combined with the host console interface on the user interface by means of the automatic switching function 140. The switching function 140 is performed seamlessly in the preferred embodiment of the invention by firmware 130 in the service processor 100. The switching function is implemented by the service processor firmware 130 monitoring and passing all console traffic on the user interface while simultaneously checking for an access sequence. The switching functions can be disabled for applications requiring separate console and LOM ports.

However, when console switching is enabled, the user can then access the service processor commands by entering an access code, in the present example a two-character ASCII sequence. In a preferred example, the access sequence is a "#.", but the "#" character may be changed to any other ASCII character or character sequence. When the access sequence is entered the interface switches from a usual "OK" console prompt to a service processor "lom>" prompt. The prompt can, however be changed. Control can be returned to the console by typing "console". The service processor supports a typical console connection protocol.

Alternatively, the service processor may optionally be configured to switch back to the console automatically in response to other predetermined events, for example on receipt of a return character, or after a predetermined time interval. The access code will be rejected if the delay between receipt of the two characters exceeds a programmable window.

In a specific embodiment of the invention, the switching function 140 is implemented by a buffer in the microcontroller 100. Signals (e.g., ASCII characters) received from the user interface 84 are buffered in this buffer. In a console mode of operation the signals received by the buffer are monitored by the firmware of the microcontroller to detect receipt of the access sequence in the signals received from the user interface 84. If no access sequence is detected, then the signals are passed to the console, interface to be passed to the host. However, if the access sequence is detected, then the received signals are then retained by the service processor for processing and are not passed to the host. Subsequent signals are processed by the service processor until it reverts to the console mode in response to one of the predetermined events described above.

Figure 5:
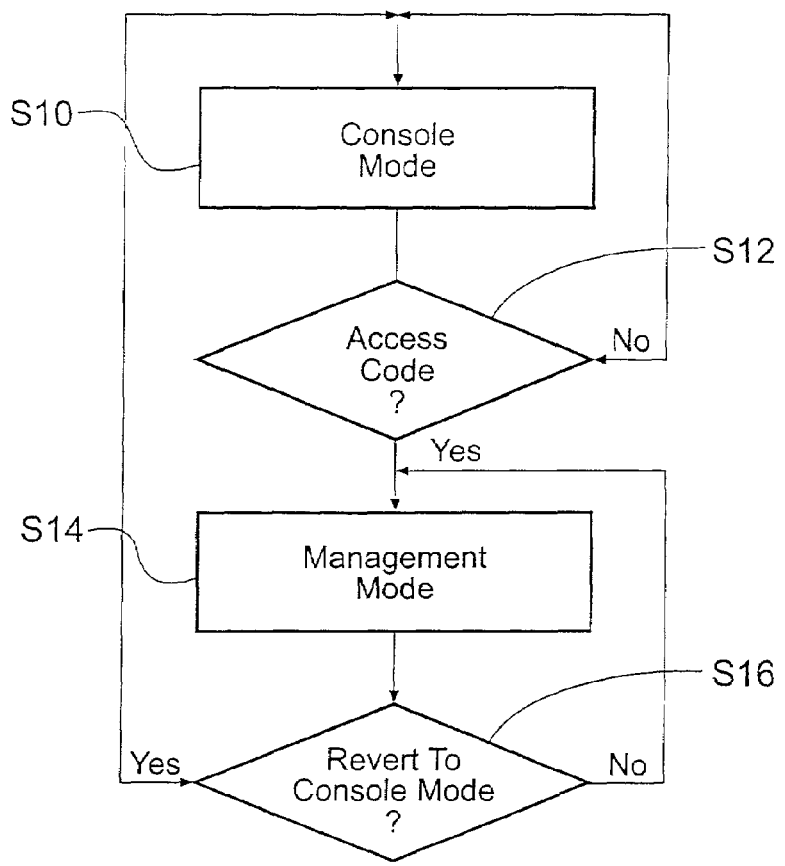
FIG. 5 is a flow diagram representing a method of operation of an embodiment of the invention for switching between operating modes.

FIG. 5 is a flow diagram illustrating the sequence of operations in switching between modes.

In step S10, the service processor is in the console mode in which communication is between the user interface 84 and the console interface 87. Signals received from the user interface 84 are buffered in the buffer of the switching function 140.

In step S12, the management interface firmware 130 monitors the buffered signals for receipt of the access sequence (e.g. "#."). If this is not detected, then the console mode of step S10 continues and the received signals (commands, data, etc) are passed to the console interface.

However, if the access sequence is detected, then the management processor enters the management (LOM) mode of step S14, and the signals (commands, data, etc) received from the user interface 84 are processed internally by the service processor 100.

Subsequent signals (commands, data, etc) are then processed by the service processor 100 until it determines in step S16 that it should revert to the console mode. This can occur as a result of a number of different events as indicated above, for example, on receipt of a "console" command and/or on receipt of a return character and/or following a predetermined time-out.

Returning to FIG. 2, the LOM_I2C bus I is a private bus, exclusively used for LOM resources. A serial EEPROM device 114 on the LOM_I2C bus is used to implement an event log, a power state memory and a configuration space. The serial EEPROM device also contains application specific code for configuring the service processor for a specific implementation as will be described below. Environment sensors 111, for example temperature sensors and fan tacho decoders are connected to the LOM_I2C bus via environmental monitoring expansion devices 112.

The service processor 100 is connected to an auxiliary separate supply rail. This means that the service processor can be functional whenever source inlet power is available to the machine, irrespective of the host power state.

Environmental management functions performed by the service processor include monitoring of a number of environmental parameters, including cooling fan operation, enclosure temperature, CPU temperature and host supply rail status.

The service processor 100 can control the rotational speed of two enclosure fans. This permits the enclosure fans to operate at reduced speed when the ambient temperature is not sufficiently high to warrant full speed operation, resulting in reduced noise emissions, reduced power consumption and improved reliability. The rotational speed of at least some of the fans can be monitored directly by the service processor 100. Additionally, fans can be monitored by specific devices added to the I2C expansion bus. Each fan provides a tacho output for monitoring purposes. Fan calibration data is configured for each specific application. The measured speed values of all monitored fans are compared to minimum threshold speed values. The minimum threshold speeds are calibrated by configuration. Hysteresis is applied to the threshold speed values to prevent multiple writes to the event log for fans operating close to the threshold value.

The service processor can monitor the internal temperature of the system enclosure. Enclosure temperature is monitored via interfaces to the I2C expansion busses. Temperature measurement devices are located such that they accurately reflect the internal temperature of the enclosure. A system can contain one or more devices capable of measuring enclosure temperature. A maximum threshold temperature value is provided for each application. When this value is exceeded the device generates an over-temperature interrupt. The service processor can monitor the substrate temperature of the host processor (CPU). CPU temperature is monitored via a device on the I2C expansion busses. In one example, CPU temperature is determined by measuring the voltage across a diode embedded in the CPU substrate. A temperature sensor can contain a register for programming a maximum threshold temperature value. When this value is exceeded the device generates an over-temperature Interrupt.

The voltage of a number of host supply rails can be monitored directly by the service processor and/or via interfaces to the I2C expansion busses. The measured host supply rail voltage values are compared to acceptance thresholds determined by configured gross tolerance margin and fine tolerance margin values. Hysteresis is applied to the tolerance margins to prevent multiple writes to the event log for host supply rails operating close to the tolerance margin limits. The measured host supply rail voltages provide a general indication of supply rail integrity.

The service processor can also monitor the status of a number of system components including the power supply sub-system, circuit breakers and fuses, and general-purpose inputs. The service processor can generate warning flags and alarms to indicate the failure or malfunction of the system components that it is monitoring.

Programming of the microcontroller forming the service processor 100 car, be achieved by pre-programming the device prior to being soldered to the board. Alternatively, it can be programmed on-board via a production test fixture. The host interface is used for re-programming in the field. A user-programming mode is utilised in this case. A loader program is embedded in flash memory within the service processor 100 microcontroller for transfer to RAM prior to entering user-programming mode. The loader program transfers data from the host operating system with the service processor device driver using the host interface.

Preferably the microcontroller firmware 130 provides generic code that is applicable for use with a range of different host systems. In such a case, application specific data for configuring the microcontroller for use with a particular host system can be held in the EEPROM 114. This reduces the number of different service processors that are needed to support different systems, with the configuration being achieved by storing appropriate configuration data in the EEPROM 114.

Thus, there has been described, a service processor, or service control module, for a computer system that includes a host processor and the service processor. The service processor includes a first port forming an external user interface and a second port forming an internal console interface. The service processor is operable to provide system management functions within the computer system. It is also operable to respond to external mode switching commands received via the user interface to operate one of two modes. The first mode is a management mode in which commands received via the user interface are processed by the service processor. The second mode is a console mode in which commands received via the user interface are passed by the service processor to the console interface for processing by the host processor. The service processor can be implemented by a dual-ported microcontroller. Remotely controlled management functions and console functions can thus be supported via a single external interface port by effecting mode switching internal to the service processor.

The service processor provides a generic controller design combining enclosure services and system management functions normally associated with a service processor. The service processor is able to meet the requirements of current and future carrier-grade platforms at very low cost. The service processor can add value in a Telco environment or in other deployments where remote management and environmental monitoring functions are applicable.

Although a particular embodiment of the invention has been described, it will be appreciated that the invention is not limited thereto and that many modifications, including additions, deletions and substitutions may be made within the sprit and scope of the claimed invention.

What is claimed is:

1. A service processor for use in a computer system that further includes a host processor, the service processor comprising:
    a management interface including a first port forming an external user interface and a second port forming an internal console interface coupled to the host processor;
    the service processor being operable to provide system management functions within the computer system and further being responsive to external mode switching commands received via the user interface to operate one of:
        a management mode in which commands received via the user interface are processed by the service processor; and
        a console mode in which commands received via the user interface are passed to the internal console interface for processing by the host processor.

2. The service processor of claim 1, comprising a microcontroller including the first and second ports and control logic for implementing internal switching between the management and console modes.

3. The service processor of claim 2, wherein the control logic comprises microcode operable to provide the internal switching between the management and console modes.

4. The service processor of claim 3, comprising internal memory holding generic microcode for controlling the operation of the microcontroller.

5. The service processor of claim 4, wherein the internal memory comprises flash memory.

6. The service processor of claim 3, further comprising external memory holding application specific information for supplementing the generic microcode.

7. The service processor of claim 6, wherein the external memory comprises an electrically erasable programmable read only memory.

8. The service processor claim 2, wherein the control logic is operable to monitor signals received at the first port and to respond to a console mode switching command by operating in the console mode and to respond to a management mode switching command by operating in the management mode.

9. The service processor of claim 1, wherein the first port provides a first serial interface and the second port provides a second serial interface.

10. The service processor of claim 1, wherein the first port includes a first UART and the second port includes a second UART.

11. A computer system comprising:
    a host processor and a service processor;
    the service processor including a management interface including a first port forming an external user interface and a second port forming an internal console interface coupled to the host processor;
    the service processor being operable to provide system management functions within the computer system and further being responsive to external mode switching commands received via the user interface to operate one of:
        a management mode in which commands received via the user interface are processed by the service processor; and
        a console mode in which commands received via the user interface are passed to the internal console interface for processing by the host processor.

12. The computer system of claim 11, wherein the first port is connected directly via a port transceiver to an external serial interface connector of the computer system.

13. The computer system of claim 11, wherein the second port is connected via a bus bridge to the host processor.

14. The computer system claim 11, wherein the computer system is a computer server.

15. The computer system of claim 11, wherein the service processor provides at least one of the following internal computer system functions: power management control; environmental monitoring; fan control; voltage rail monitoring; and system status monitoring.

16. A method of providing external system management and console monitoring services in a computer system that includes a host processor, the method comprising:
    receiving external commands at a first port of a service processor in the computer system, the service processor providing management functions within the computer system and further including a second port, the first port forming an external user interface for the service processor and the second port forming an internal console interface;
    responding to a management mode switching command received via the user interface by operating in a management mode in which commands received via the user interface are processed by the service processor; and
    responding to a console mode switching command received via the user interface by operating in a console mode in which commands received via the user interface are passed by the service processor to the internal console interface for processing by the host processor.

17. The method of claim 16, wherein the first and second ports are respective ports of a microcontroller.

18. The method claim 16, wherein signals received from the user interface are buffered in a buffer, and wherein, in the console mode, the buffer is monitored for signals representative of an access sequence forming the management mode switching command.

19. A method of providing external system management and console monitoring services in a computer system that includes a host processor and a service processor, the service processor providing management functions within the computer system and including a first port forming an external user interface for the service processor and the second port forming an internal console interface, the method comprising:

operating in a console mode in which commands received via the user interface are passed by the service processor to the internal console interface for processing by the host processor;

receiving signals from the user interface;

determining from the received signals if an access sequence has been received;

on receipt of an access signal, switching from the console mode to a management mode in which commands received via the user interface are processed by the service processor;

operating in the management mode; and switching back to the console mode in response to a predetermined event.

20. The method of claim 19, wherein the first and second ports are respective ports of a microcontroller.

21. The method of claim 19, wherein signals received from the user interface are buffered in a buffer, and wherein, in the console mode, the buffer is monitored for signals representative of an access sequence forming the management mode switching command.

\* \* \* \* \*